(12) United States Patent
Kumar

(10) Patent No.: US 8,244,953 B1
(45) Date of Patent: Aug. 14, 2012

(54) SYSTEM AND METHOD FOR FASTER DATA RETRIEVAL FROM TAPE MEDIA

(75) Inventor: Ranjit Kumar, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 382 days.

(21) Appl. No.: 11/959,386

(22) Filed: Dec. 18, 2007

(51) Int. Cl.
  *G06F 12/00* (2006.01)
  *G11B 5/09* (2006.01)
(52) U.S. Cl. ............. 711/4; 711/111; 360/27; 360/72.1
(58) Field of Classification Search .................. None
  See application file for complete search history.

(56) References Cited

U.S. PATENT DOCUMENTS

| | | | |
|---|---|---|---|
| 5,210,851 A * | 5/1993 | Kato et al. | 360/48 |
| 5,450,250 A * | 9/1995 | Garcia et al. | 360/48 |
| 6,779,080 B2 * | 8/2004 | Basham et al. | 711/112 |
| 2002/0099906 A1 * | 7/2002 | Chan et al. | 711/111 |
| 2007/0206792 A1 * | 9/2007 | Saito | 380/201 |

* cited by examiner

*Primary Examiner* — Gary J Portka
(74) *Attorney, Agent, or Firm* — Dergosits & Noah LLP; Todd A. Noah

(57) ABSTRACT

The present invention is a system and method for extending the functionality of tape device tapemarks. When data is backed up to tape, the tape controller may mark the tape with a tapemark to organize portions of the tape. Present tape storage devices are limited to a single type of tapemark; therefore current recovery requests require knowledge of the tapemark location. The present invention allows for unique types of tapemarks. By allowing the tape device, tape controller and/or backup and recovery software to recognize unique tapemarks, data organized by unique tapemarks can be recovered without referencing tapemark location, thereby optimizing recovery. Unique tapemarks may be encrypted such that data recovery is only completed upon verification of the requester.

22 Claims, 1 Drawing Sheet

SYSTEM AND METHOD FOR FASTER DATA RETRIEVAL FROM TAPE MEDIA

TECHNICAL FIELD

The present invention relates generally to backup and storage systems, and specifically, to data recovery from a tape backup device.

BACKGROUND OF THE INVENTION

Tape backup devices and tape media storage are ubiquitous in the data backup and recovery field. Because of the low-cost of production, speed of use and robustness of the media, tape backup remains a popular choice for data backup and recovery. Despite longtime use and popularity, there are still ways to improve upon existing tape media technology.

A tape backup system may be comprised of multiple components, where each component is responsible for some portion of the backup of data from a client computer to a tape backup device. The tape backup device may be directly connected to the client computer, or it may be controlled by a separate tape backup server. Backup and recovery software may control the tape backup device and may enable migration of the data from the client computer to the tape backup device. This software may reside on the tape backup server, or may reside on the client computer, or may be distributed partially on both computers. The backup and recovery software manages tape backup and recovery processes. Specifically, the backup and recovery software helps move data from the client computer to the tape device during backup, and/or helps move data from the tape device to the client computer during recovery. One will appreciate that this may be a standalone software application or form part of another integrated software application, such as an operating system or device controller software program.

Data is sent and written to tape using a method known as "streaming" or transmitting "data streams." In some cases, data is sent in packets based upon the buffer capacity of the tape backup server (or the client computer). These packets are called "data blocks." A backup server may stream data from the client computer to the tape device one data block at a time, or may simultaneously stream multiple data blocks to the tape device. Once written to the tape media, the backup and recovery software may provide further organization of the stored data. For example, the backup and recovery software may cause the tape media to use tapemarks to organize data blocks written to tape. Tapemarks include filemarks and setmarks, which are two tape markers that can be written on the tape media. These markers may consist of a string of characters, numbers or bits recognized by the backup and recovery software as different portions of the tape media. In some tape backup devices, the data between two filemarks is called a "tape file," which may include one or more data blocks. Setmarks may encompass one or more tape files, and therefore may encompass multiple filemarks. Setmarks and filemarks are useful because they provide a convenient way to separate tape files such that files may be located by referring to setmarks and filemarks rather than searching the whole tape. Tape devices typically store a large number of tape files. In addition, tapemarks may be strung together to signify special portions of the tape. For example, two consecutive filemarks may indicate the end of data on a tape volume. The purpose of these tapemarks is to allow quick tape navigation, since the backup and recovery software keeps track of the number and location of each tapemark it has created.

Tapemarks are also useful during recovery. When a client computer sends a request to the backup and recovery software to recover certain data files that have been backed up to tape, the backup and recovery software must locate and deliver these data files back to the client. Because of the large number of data files on the tape, it is tedious to search the tape device to find the requested data files. In order to speed up data recovery, the backup and recovery software may refer to the tapemark nearest the requested data files. This tapemark information may form part of the client computer's request, or it may be looked up by the backup and recovery software using an internally stored directory of used tapemarks. In either case, the backup and recovery software will deduce the location of the requested data files by referring to how many tapemarks away from the beginning of tape ("BOT") or how many tapemarks away from the end of tape ("EOT"). For example, a requested data file may be located at the fifth tapemark from BOT, another at the seventh tapemark from BOT, and another at the third tapemark from EOT. The backup and recovery software will then advance or reverse the tape media until it finds the correct tapemark, and then it will advance or reverse the tape media until it finds the requested data file. Using tapemarks therefore reduces the amount of time for data file recovery, because it is faster for the tape device to advance or reverse to a specific tapemark, rather than requiring a search through all the data files on the tape media. Tapemarks are detectable at high speeds, thus allowing quicker positioning of the tape media near the requested data files.

Present tape storage devices are limited to a single type of tapemark. In other words, all of the tapemarks written on the tape will consist of the same string of numbers, characters or bits. As such, when a data recovery request is sent to the tape device, the software or the tape controller must refer to the respective tapemark by number, which may be based on the number of tapemarks from the BOT or EOT. As more data and more tapemarks are written to the tape, this method of recovery can become cumbersome and can lead to data recovery error or failures. Further, if the user needs to recover multiple data files located near many different tapemarks, recovery may be slowed as the tape backup device has to advance and/or reverse the tape media to find the requested data files. In addition to lengthening recovery time, this causes wear and tear on the tape device. Advancing and reversing the tape media over and over again for a single request of multiple data files will eventually lead to mechanical failure. As such, instructing the tape device to repeatedly position the tape is sub-optimal. It would be beneficial to find a way to extend the functionality of current tapemarks without creating a large data footprint on the tape media. What is therefore needed is a more efficient way to navigate tape media and locate desired tape files for recovery, while reducing wear and tear on the tape device.

BRIEF DESCRIPTION OF THE FIGURES

The present invention is illustrated by way of example and not limitation in the figures of the accompanying drawings, in which like references indicate similar elements, and in which.

DETAILED DESCRIPTION OF THE INVENTION

The present invention provides a system and method for increasing the efficiency of tape storage devices by extending the capabilities of tapemarks. An embodiment of the present invention provides for new types of customizable and unique tapemarks. This embodiment provides a way to encode and recognize tapemarks with different bit patterns. One skilled in the art will appreciate that the use of different bit patterns to customize tapemarks is merely one example of how tapemarks may be extended. Other methods of extending tapemarks are possible without departing from the scope of this disclosure or the concept of the present invention. One will also appreciate that while embodiments of the present invention may be described as pertaining to filemarks or setmarks, any type of tapemark or tape media marker may implement the present invention. Further, while the examples below are described as pertaining to backup and recovery operations, one will appreciate that the present invention may apply to any tape storage, regardless if for backup purposes or other short or long term storage purposes.

It should be appreciated that the present invention can be implemented in numerous ways, including as a process, an apparatus, a system, a device, a method, or a computer readable medium such as a computer readable storage medium comprising computer program instructions or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

Figure 1:
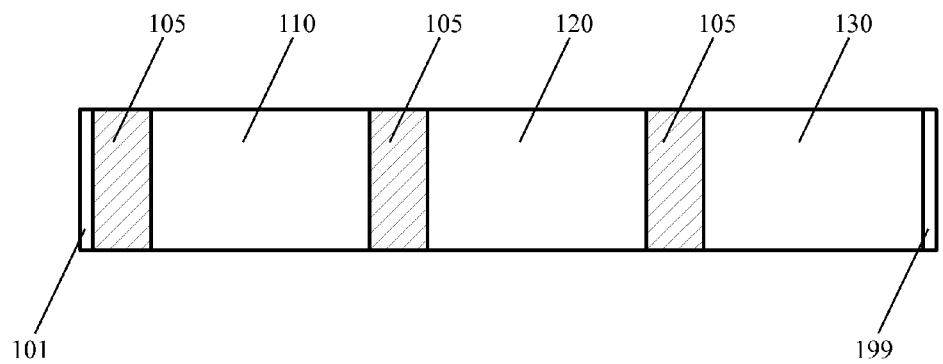
FIG. 1 is an exemplary block diagram of prior art filemarks on a tape media.

FIG. 1 illustrates how tape media appears with prior art tapemarks. 101 refers to the BOT, and 199 to the EOT. In between BOT 101 and EOT 199 are various tape files 110, 120 and 130, each tape file comprising one or more data blocks. Each tape file is separated by a tapemark 105. Each tapemark 105 uses the same string of numbers, characters and/or bit pattern. As such, the only way to distinguish each tapemark 105 is to know how far it is from BOT 101 or EOT 199.

Figure 2:
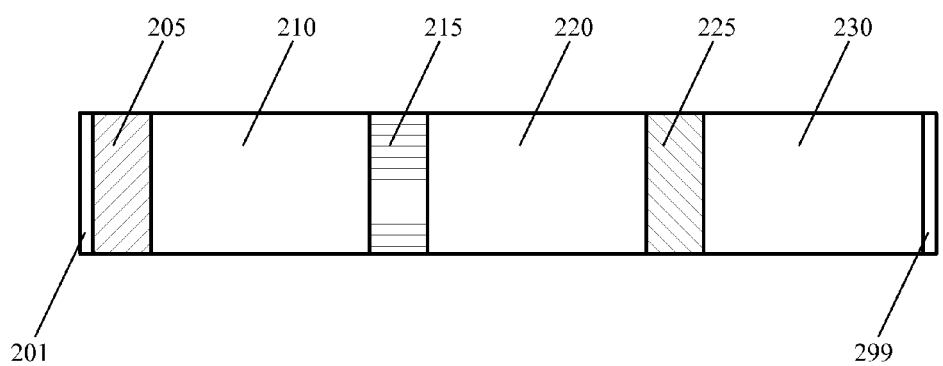
FIG. 2 is an exemplary block diagram of the filemark aspect of an embodiment of the present invention.

FIG. 2 shows the tape media utilizing an embodiment of the present invention. 201 refers to the BOT, and 299 to the EOT. In between BOT 201 and EOT 299 are various tape files 210, 220 and 230, each tape file comprising one or more data blocks. FIG. 2 differs from FIG. 1 in that FIG. 2 depicts each tape file separated by a different tapemark. Tape file 210 is preceded by tapemark 205, tape file 220 is preceded by tapemark 215, and tapefile 230 is preceded by tapemark 225. Tapemarks 205, 215 and 225 may differ from one another by having different bit patterns. In one embodiment, tapemarks 205, 215 and 225 all have different bit patterns. In an embodiment, tapemarks 205 and 215 may have the same bit pattern, but this may differ from the bit pattern that comprises tapemark 225. As shown, the present invention provides for multiple tapemarks that may be unique from each other, unlike the tapemarks found in the prior art, which are all the same for a given tape. One will appreciate that many combinations are possible so long as there are at least two different bit patterns of tapemarks on the tape media.

FIG. 2 therefore illustrates two unique uses for the present invention. In one embodiment, each tape file may be separated by a tapemark, each tapemark having a different bit pattern from the next. In an embodiment, multiple tapemarks may share a same bit pattern so long as there are at least two variations of bit patterned tapemarks written to the tape media. In this fashion, a tapemark may be written to tape media that may share the bit pattern of a previously written tapemark. Thus, the present invention enables recognition of multiple unique bit patterns, even if only one bit pattern is written at a time.

The first embodiment may be used to separate tape files on the tape media for any number of reasons. The second embodiment may be used to organize tape files on the tape media for different classifications. For example, a user may be assigned a specific bit pattern so that all tape files backed up by that user are locatable by that specific bit pattern. A second user may be assigned a second bit pattern so that all tape files backed up by that second user will be locatable by the second bit pattern. Alternatively, instead of users, different months may be assigned a specific bit pattern so that all tape files written to tape for a specific month may be selected for recovery. One will appreciate that there are many combinations possible using the present invention. One will also appreciate that by using different bit patterns, recovery of data files will no longer require knowledge of the location of a tapemark nearest the data files, only the bit pattern assigned to that tapemark nearest the data files.

The present invention therefore enables recovery of data files by referring to tapemarks by bit pattern, rather than location. Not only does the present invention allow for customizable bit patterns, but it also reduces wear and tear on the tape device. If a tape device is rewound to the BOT, then using the present invention, searches for data files for recovery may be done sequentially and in the forward direction. As will be explained below, during data recovery, the tape device need only search for the occurrence of a specified bit patterned tapemark. This can be done sequentially from BOT to EOT in a single direction, without having to count forwards or backwards from the BOT or EOT. Since the tape device moves only in one direction, then rewinds to BOT after recovery, there is less wear and tear on the tape device mechanism.

Additional Software Commands

In one embodiment, the backup and recovery software may be responsible for managing the different bit patterns for the extended tapemark aspect of the present invention. A separate software application may also be responsible for managing the different bit patterns. In either embodiment, the software may cause the backup server or the client computer to store a directory of different bit patterns that will be used or that have been used for extended tapemarks. Alternatively, this directory may be stored on the tape media or on a flash media chip or media in cassette chip ("MIC") associated with the tape media. Other associative internal or external storage memory may be applied as well. In an embodiment, the backup and storage software or other such software stores the number of times a bit pattern has been written to tape so that during recovery, once this number has been encountered, the tape device will not need to be searched further. This will be discussed in more detail below, in the Recovery section.

The tape device that houses the tape media may be controlled by the backup and storage software or it may have its own tape controller software with which the backup and recovery software communicates. In either case, three additional software commands may need to be programmed into the controller or backup and recovery software in order to enable the present invention. The first command may cause creation of a bit pattern for the new tapemark. Alternatively, the first command may cause allocation of a bit pattern from a stored directory of different bit patterns. The bit pattern may be new, or it may have already been associated with a tape file on the tape media. A second command may cause the tapemark to be written to the tape media. As noted previously, the present invention obviates the need to record the tapemark's location with respect to BOT or EOT. However, if the user or administrator wishes, then the backup and recovery software, tape controller software or other such software may cause the tapemark location to be recorded as well as an added safeguard. The third command searches for a tapemark by fast forwarding tape media to the next occurrence of the designated tapemark. The third command will enable reading of the tape file adjacent to that tapemark to locate a requested data file within the tape file. This command may be used during data file recovery. One will appreciate that these three software commands are merely exemplary, and that other commands may be used to enable the present invention without departing from the scope of this disclosure. One will also appreciate that these three commands may be collapsed into a single instruction or expanded into multiple instructions, depending on the capabilities of the tape backup and recovery system, tape device or tape software.

Saving Data Streams to Tape

According to one embodiment of the present invention, when a backup and recovery software is ready to stream data to tape, it first designates a tapemark using the first command described above. This step may be performed by the backup and recovery software, tape device controller software or other such software application that may be part of existing software or a new software application. Bit patterns, which may comprise numbers, characters or other data bits, may be previously stored in an directory in the tape device, backup server or client computer. This directory may include a list of available bit patterns for designation, or may include a list of bit patterns already designated, or a combination of both. Alternatively, the backup and recovery software or other such software may create a bit pattern.

Once a bit pattern has been designated for association with the data stream, it may be written to the tape media as in the form of a tapemark by the backup and recovery software or other software application, using the second command described above. In this fashion, the tapemark will be written to the tape before the data stream. Alternatively, the backup and recovery software may cause the data to be streamed and written to the tape media, and then it will write the tapemark. One will also appreciate that the same tapemark may also be written both before and after the data stream. The option of writing the tapemark before, after, or both before and after the data stream may be selected using a setting of the tape device, tape controller software, or the tape backup and recovery software. One will appreciate that recovery will still be performed regardless of how the data stream is placed in relation to its designated bit pattern tapemark. This will be further explained in the next section.

As explained previously, data may be streamed to the tape device as data blocks, which are packets of data that are sized depending on the memory buffer-handling capabilities of the client computer and/or backup and recovery software. In some backup systems, data may only be streamed as blocks of a certain byte size. The data block size will typically be the same byte size of the memory buffer. If the data selected for streaming is larger than the data block size, then the data will be divided up and streamed using more than one data block. In such a case, data selected for tape storage may not be sequentially streamed, but rather divided into blocks, then streamed to tape when memory resources become available. One data block for a portion of a first set of data may be streamed, then another data block for a portion of a different set of data may be streamed while the system prepares a second portion of the first set of data. As a result, even though data may be selected for tape storage at the same time, it may not be sequentially written to the tape media. Because of the size of the data and the timing of its respective data block streaming, the data may be placed at different non-adjacent locations on the tape media. With prior art tapemarks, this requires that the backup system keep track of more tapemarks than originally anticipated, since each data block may require its own tapemark. Since the data may be divided up into multiple data blocks and the data blocks written somewhat randomly, the location of each data block will need to be tracked and recorded by the backup system. This can slow the backup system and can lead to potential errors during recovery, especially if the system loses track of where the tapemarks and associated data blocks are written.

With the present invention, because tapemarks are identified by bit pattern, their location does not matter. If data selected for tape storage is so large that it requires division into multiple data blocks, the backup system, using the specially-enabled backup and recovery software, will simply write the designated bit patterned tapemark with each data block as each respective data block is written to tape. As will be explained further below, recovery simply requires searching for the occurrence of the tapemark on the tape by matching the designated bit pattern, rather than searching for each tapemark by referring to its location in relation to BOT or EOT. As noted previously, the tapemark may be written before, after, or before and after the data block, depending on the software or system settings.

The steps of writing data to tape will continue until all data has been streamed and written to tape. Once complete, an aspect of the present invention may cause the backup application to write two consecutive tapemarks to signify the end of the tape file. Once all data streams have been written, an aspect of the present invention may cause an additional pair of tapemarks to be written to tape to denote the end of all data. This may be a filemark or other equivalent tapemark.

While the backup and recovery software may refer to the each tapemark by its designated bit pattern, this bit pattern may not be readable or provided to the client computer. Instead, a tapemark may be referred to by a readable character string, or may have an alias or softlink that a user may substitute in place of a character string. For example, if the tape files originate from a single user such that the tape files have a single bit patterned tapemark for that user, that user may refer to that tapemark using his name, a custom-created name, or a string of characters and/or numbers known to the user. The name assigned to the tapemark may vary, so long as the tape backup system possesses the capability of resolving the tapemark name with its actual bit pattern, and locate it accordingly on the tape media. In this fashion, the present invention will enable the backup and recovery system to recognize users with multiple designated tapemarks for each user, or a single user with multiple designated tapemarks.

The actual method that a designated tapemark is written to tape does not matter, so long as the backup and recovery system recognizes more than one bit pattern for more than one type of tapemark. For example, in some backup and recovery systems, tapemarks and tape files are written across the entire width of the tape media. In other backup and recovery systems, the tape media is divided such that tape files are written in one portion, and the metadata and/or tapemarks are written on another portion of the tape directly adjacent to their respective tape file (sometimes called a "special control information section"). One will appreciate that no matter the actual physical orientation of tape files and tapemarks on the tape media, aspect of the present invention may be enabled, so long as the backup and recovery system recognizes at least two bit patterns for tapemarks. The unique bit pattern of the present invention's tapemarks is therefore extensible and flexible in many different tape backup contexts.

One will appreciate that the specially designated tapemarks not be any larger than prior art tapemarks. In other words, the bit pattern for the tapemarks of the present invention should not contain a greater number of bits than prior art tapemarks. This prevents overloading present tape media with large tapemarks, detracting from the usefulness of the present invention. By keeping the tapemarks of the present invention at a small size, the memory footprint on the tape media is minimized.

Recovering Data Streams from Tape

The designated tapemark aspect of the present invention improves data recovery as well. As noted previously, the present invention enables backup and recovery system to organize data on tape media, saved as tape files, by referring to designated tapemarks having different bit patterns. As such, in order to locate data within one or more tape files, one need only refer to the designated tapemark associated with those tape files, rather than the location of the tapemarks with respect to their distance from BOT or EOT. For example, if a user has been assigned a specific bit patterned tapemark, and that user has data stored on tape media using the specific tapemark, then to recover that data the user need only refer to the specific tapemark. In prior art systems, that user would have to refer to tapemarks by location in order to recover the data. Thus, a request for recovery might involve searching for data files in the tape file near tapemark number five from the BOT, number seven from the BOT, and number five from EOT. Either the user, client or backup and recovery software would have to keep track of these data file, tape file and tapemark locations, and the tape device would have to fast forward and/or rewind the tape media to each location. With the present invention, the backup and recovery software (or other software) may simply search for the designated tapemark associated with the requested data files or tape files, then once that tapemark is located, may then read the tape file associated with the located tapemark to locate and recover the requested data files. This may be performed using the third command described above. Once located, the files may be streamed back to the client or another specified computer. This may speed data recovery.

As noted above, the present invention may cause the backup and recovery system to store a directory of bit patterns already designated as tapemarks and written to tape. As such, locating a tapemark may simply involve reading tape media until a tapemark is found, then matching the tapemark with one in the directory. Alternatively, the user or client computer may supply the bit pattern, if known, and the present invention will cause the backup and recovery system to match the supplied bit pattern with tapemarks found on the tape media. If the bit patterns are not known to the user or client computer, the user or client computer may supply an assigned alias or name to correspond to the bit pattern. The backup and recovery software would then find the bit pattern associated with the assigned alias or name, and search for the bit pattern on the tape media. This embodiment prevents tapemark mismatch if the user of client computer supplies an incorrect bit pattern or tapemark.

The present invention may also enable the system to know how many times a designated tapemark has been written to tape. In this embodiment, recovery time may be shortened since the backup and recovery system will know when to stop searching for occurrences of the tapemark. For example, if a user is requesting all tape files associated with a certain tapemark, and the system knows that there is only two tape files associated with that certain tapemark, then after locating the two instances of tapemarks associated with those tape files, it will cease searching. The system need not look further and may stream those tape files back to the user's computer without wasting time looking for further instances of the tapemarks. This makes recovery more efficient and prevents unnecessary recovery operations.

If the backup and recovery system does not keep track of the number of times a tapemark has been written to tape, then recovery may proceed as follows. One or more data files may be requested for recovery. This may be done by issuing a request to the backup server using the backup and recovery software application or other data recovery methods known in the art. The backup and recovery software application will refer to internally stored records to locate in which tape file the requested data file or files are located. The application will then refer to a directory to see which tapemark has been designated for that tape file. Once a tapemark is recognized by the backup and recovery software, the software sends an instruction to the tape device either directly or through the tape controller software to advance the tape media to the first occurrence of that tapemark. Once this tapemark is found, the backup and recovery software reads or causes to be read the tape file that follows the specified tapemark. The requested data file or files will be located and marked for recovery. Reading will continue until a another tapemark is encountered. This may be a tapemark with another bit pattern or a tapemark signifying the end of the tape file. At that point, it may advance the tape media to find the next occurrence of the designated tapemark. If the designated tapemark is encountered again, then the backup application will read the tape file that follows until it reaches the end of the tape file or another bit patterned tapemark. This process may continue until the end of the data stream or the EOT has been reached. Once all the tape files associated with the designated tapemark has been located and read, the requested data files within those tape files may be streamed to the client computer or another location for recovery.

In an embodiment, instead of waiting until all data files are located, data files may be streamed to the client computer as soon as they are encountered. In this embodiment, as soon as a tape file associated with the designated tapemark is located, the tape file will be searched for the requested data file. Once the requested data file is located, it may be immediately streamed to the client computer. During streaming, the backup and recovery software may read the tape file for the next occurrence of the designated tapemark. Alternatively, the backup and recovery software may wait until the requested data file has been completely streamed to the client computer before advancing the tape media and searching for the next occurrence of the designated tapemark.

The above steps may be modified in situations where the backup and recovery software settings require that designated tapemarks are written after a data stream, or written before or after a data stream. One will appreciate that the location of an associated tapemark does not detract from the concept of the present invention, so long as the backup and recovery system has the capability to look for tapemarks of at least two different bit patterns, and search through and recover the data files associated with those tapemarks. Similarly, the backup and recovery system may be instructed to search for more than one bit pattern of tapemark at a time. This embodiment may be useful for users having multiple designated tapemarks, and wish to recover data files associated with those tapemarks.

Security Features

An added advantage of the present invention is its capability to provide additional embedded security features by virtue of its use of multiple bit patterns for tapemarks. As a general example, if the correct bit pattern is not specified, then the associated tape files will not be recoverable. The backup and storage system cannot recover tape files or data files if an incorrect bit pattern is specified, because that bit pattern will not exist on the tape media. Tapemark bit patterns may be created or designated by the backup and recovery system or system software. The client computer may be kept separate from knowing the actual bit patterns if desired, in order to keep the bit patterns secure.

In an embodiment, if the user is using an alias or substitute name for a tapemark, then the backup and recovery system will have to resolve the name to identify the actual bit pattern for the user's tapemark or tapemarks. An additional password security layer may be added using known authentication methods that will prevent unauthorized access. For example, if the user does not provide the proper tapemark alias and tapemark password, the system will not resolve the tapemark alias and will therefore not locate the tapemark on the tape media.

In one embodiment of the present invention, tapemarks may be encrypted for added security or combined with additional data. For example, a tapemark may be combined with a timestamp and the tape device's identification number. The timestamp may be the tapemark's or tape file's time of creation, last access time, or any other time-based information. The tape devices' identification number may be a serial number, or other unique device identifier known in the art. A cryptographic hash function may then be applied to the combined tapemark, timestamp and tape device identification number to form an encrypted tapemark. This encrypted tapemark may be provided to the user or stored on the client computer. When access to the tape files associated with the encrypted tapemark is requested, the encrypted tapemark must be deciphered using the hash function before access is granted and data is recovered. One will appreciate that other encryption or authentication methods may be applied as well without departing from the present disclosure.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. For example, while specific embodiments of the present invention are directed to tape storage devices, various concepts and aspects of the present invention are equally applicable to optical disk storage devices.

What is claimed is:

1. A method for writing data objects to tape comprising:
    receiving a request to write a first data object to tape;
    associating a first tapemark with the first data object, the first tapemark being identified by a first bit pattern that is independent of location on the tape;
    receiving a request to write a second data object to tape;
    associating a second tapemark with the second data object, the second tapemark being identified by a second bit pattern that is independent of location on the tape and is different from the first bit pattern, wherein the first bit pattern is configured to identify the first data object on the tape, and the second bit pattern is configured to identify the second data object on the tape; and
    writing the data objects and tapemarks to tape in a longitudinal format such that the data objects are separated by associated tapemarks and each data object is located adjacent to its associated tapemark.

2. The method of claim 1, wherein the first tapemark and first data object are written to the tape prior to receiving the request to write the second data object to tape.

3. The method of claim 1, wherein the first or second bit pattern includes an alphanumeric string.

4. The method of claim 3, wherein the first or second bit pattern encodes at least one of a user name and a time stamp.

5. The method of claim 4, wherein the first and second bit patterns are stored in a directory of designated bit patterns, the method further comprising matching a tapemark on the tape with a bit pattern stored in the directory to locate a desired data object.

6. A method for reading data objects from tape comprising:
    receiving a request to recover a specified data object from a tape having first and second tapemarks recorded between data objects in a longitudinal format on the tape, wherein the first and second tapemarks each have different bit patterns that are independent of location on the tape;
    searching the tape for a tapemark previously associated with the specified data object by matching the bit pattern of the tapemark previously associated with the specified data object to respective bit patterns for the first and second tapemarks stored in a directory of designated bit patterns;
    locating the tapemark previously associated with the specified data object on the tape;
    reading the specified data object that is adjacent to the located tapemark.

7. The method of claim 6, wherein the bit pattern for each of the first and second tapemarks encodes at least one of a user name and a timestamp.

8. The method of claim 6, further comprising directly using the user name or timestamp encoded in the tapemark previously associated with the specified data object to recover the data object from tape.

9. The method of claim 6, further comprising streaming the data object from the tape to a client computer.

10. A computer program product, comprising a computer usable medium having a computer readable program code embodied therein, the computer readable program code adapted to be executed to implement a method for writing to tape, the method comprising:
    receiving a request to write a first data object to tape;
    associating a first tapemark with the first data object, the first tapemark being identified by a first bit pattern that is independent of location on the tape;
    receiving a request to write a second data object to tape;
    associating a second tapemark with the second data object, the second tapemark being identified by a second bit pattern that is independent of location on the tape and is different from the first bit pattern, wherein the first bit pattern is configured to identify the first data object on the tape, and the second bit pattern is configured to identify the second data object on the tape; and
    writing the data objects and tapemarks to tape in a longitudinal format such that the data objects are separated by associated tapemarks and each data object is located adjacent to its associated tapemark.

11. The computer program product of claim 10, wherein the first tapemark and first data object are written to the tape prior to receiving the request to write the second data object to tape.

12. The computer program product of claim 10, wherein the respective bit pattern for first or second tapemark comprises an alphanumeric string.

13. The computer program product of claim 12, wherein the respective bit pattern encodes at least one of a user name and a time stamp.

14. The computer program product of claim 10, wherein the first or second data object is a tape file.

15. A computer program product, comprising a computer usable medium having a computer readable program code embodied therein, the computer readable program code adapted to be executed to implement a method for reading tape, the method comprising:
   receiving a request to recover a specified data object from a tape having first and second tapemarks recorded between data objects in a longitudinal format on the tape, wherein the first and second tapemarks each have different bit patterns that are independent of location on the tape;
   searching the tape for a tapemark previously associated with the specified data object by matching the bit pattern of the tapemark previously associated with the specified data object to respective bit patterns for the first and second tapemark stored in a directory of designated bit patterns;
   locating the tapemark previously associated with the specified data object on the tape;
   reading the specified data object that is adjacent to the located tapemark.

16. The computer program product of claim 15, wherein the bit pattern for each of the first and second tapemarks encodes at least one of a user name and a timestamp.

17. The computer program product of claim 16, further comprising directly using the user name or timestamp encoded in the tapemark previously associated with the specified data object to recover the data object from tape.

18. The computer program product of claim 15, further comprising streaming the data object from the tape to a client computer.

19. A method for writing data objects to tape, comprising:
   receiving a request to write a plurality of data objects to tape;
   associating with each data object a tapemark from among a plurality of tapemarks including at least a first tapemark having a first bit pattern that is independent of location on the tape and a second tapemark having a second bit pattern that is independent of location on the tape, the second bit pattern being different than the first bit pattern; and
   writing the plurality of data objects and associated tapemarks to tape in a longitudinal format, each data object separated from an adjacent data object by its associated tapemark.

20. A method as in claim 19, wherein each of the plurality of tapemarks has a different bit pattern.

21. A method as in claim 19, wherein each bit pattern is assigned to a different characteristic of the data objects.

22. A method as in claim 21, wherein the different characteristics that may be assigned a different bit pattern include user names and time stamps.

* * * * *